United States Patent
Nakamura

(10) Patent No.: US 9,509,862 B2
(45) Date of Patent: Nov. 29, 2016

(54) IMAGE PROCESSING SYSTEM, IMAGE OUTPUT DEVICE, AND IMAGE PROCESSING METHOD

(71) Applicant: Satoshi Nakamura, Kanagawa (JP)

(72) Inventor: Satoshi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/975,985

(22) Filed: Dec. 21, 2015

(65) Prior Publication Data
US 2016/0198051 A1    Jul. 7, 2016

(30) Foreign Application Priority Data
Jan. 6, 2015    (JP) ................. 2015-000716

(51) Int. Cl.
*H04N 1/04* (2006.01)
*H04N 1/00* (2006.01)
*H04N 1/393* (2006.01)
(Continued)

(52) U.S. Cl.
CPC ......... *H04N 1/00241* (2013.01); *G06T 3/4053* (2013.01); *G06T 3/4092* (2013.01); *H04N 1/32128* (2013.01); *H04N 1/3935* (2013.01); *G06T 2210/36* (2013.01)

(58) Field of Classification Search
CPC .... A61B 6/032; A61B 6/488; A61B 6/5211; A61B 6/5258; A61B 6/5282; A61B 6/542; A61B 6/545; G06K 9/66; G06T 11/008; G06T 2207/10081; G06T 2207/30028; G06T 2207/30061; G06T 3/4046; G06T 5/002
USPC ...... 358/488, 1.15, 1.13, 296; 382/131, 135, 382/181; 399/366, 8
See application file for complete search history.

(56) References Cited

U.S. PATENT DOCUMENTS

| | | | | |
|---|---|---|---|---|
| 5,909,602 A | * | 6/1999 | Nakai | ................ G03G 21/046 358/1.15 |
| 5,946,457 A | * | 8/1999 | Nakai | ................ H04N 1/00127 358/1.13 |

(Continued)

FOREIGN PATENT DOCUMENTS

JP    2003-018398    1/2003

OTHER PUBLICATIONS

Shuji Senda et al., "Example-based Super Resolution to Achieve Fine Magnification of Low-Resolution Images", NEC Technical Journal vol. 65 No. 2, 2012, pp. 73 to 76.

(Continued)

*Primary Examiner* — Negussie Worku
(74) *Attorney, Agent, or Firm* — IPUSA, PLLC

(57) ABSTRACT

An image processing system includes an image reading device and an image output device. The image reading device includes an image conversion unit configured to create a low-quality image by reducing a quality of a predetermined image, a dictionary creating unit configured to create a dictionary for restoring the low-quality image to the predetermined image, the dictionary being created by using the predetermined image and the low-quality image, and a sending unit configured to send the low-quality image and the dictionary or information relating to the dictionary. The image output device includes a receiving unit configured to receive the low-quality image and the dictionary or the information relating to the dictionary, and an image restoring unit configured to restore the low-quality image to the predetermined image, by using the dictionary or the information relating to the dictionary.

7 Claims, 7 Drawing Sheets

(51) Int. Cl.
*H04N 1/32* (2006.01)
*G06T 3/40* (2006.01)

(56) References Cited

U.S. PATENT DOCUMENTS

| | | | |
|---|---|---|---|
| 6,766,067 B2 | 7/2004 | Freeman et al. | |
| 7,970,213 B1* | 6/2011 | Ruzon | G06K 9/00463 382/217 |
| 9,176,986 B2* | 11/2015 | Petrou | G06F 17/30253 |
| 9,296,409 B2* | 3/2016 | Aoki | B62D 1/16 |
| 9,373,029 B2* | 6/2016 | Hull | G06K 9/00463 |
| 9,396,409 B2* | 7/2016 | Zavesky | G06K 9/6202 |
| 2008/0002225 A1* | 1/2008 | Iwasaki | G06F 3/1205 358/1.15 |
| 2009/0164561 A1* | 6/2009 | Ono | G06T 11/60 709/203 |
| 2012/0045095 A1* | 2/2012 | Tate | G06T 5/003 382/103 |
| 2015/0169632 A1* | 6/2015 | Tsai | G06F 17/30244 382/305 |
| 2015/0302566 A1* | 10/2015 | Shibata | G06T 5/005 382/159 |
| 2015/0332435 A1 | 11/2015 | Motohashi et al. | |

OTHER PUBLICATIONS

Jianchao Yang et al.,"Image Super-Resolution via Sparse Representation", IEEE Transactions on Image Processing, vol. 19, Issue 11, 2010, pp. 1 to 13.

* cited by examiner

IMAGE PROCESSING SYSTEM, IMAGE OUTPUT DEVICE, AND IMAGE PROCESSING METHOD

BACKGROUND OF THE INVENTION

1. Field of the Invention

The present invention relates to an image processing system, an image output device, and an image processing method.

2. Description of the Related Art

As image data is usually two-dimensional multi-valued data, the data volume of image data is enormously large compared to text data. In a case where image data is saved in a database and transmitted by a network, from the viewpoint of efficiently using limited resources (storage capacity and network band), the data volume is preferably reduced. For this reason, in general, the quality of the image data is reduced, by resolution conversion (decreasing the resolution) such as pixel thinning, for example, down sampling, etc., and by lossy compression such as JPEG (Joint Photographic Experts Group) compression, etc.

Meanwhile, there are problems accompanying the reduction of quality. By resolution conversion, the sense of resolution decreases as the number of pixels decreases due to pixel thinning, for example, down sampling, and the image gives an overall blurry impression. Lossy compression is widely used as the data volume can be effectively reduced without changing the image size; however, the compression efficiency and the image quality are in a tradeoff relationship. Particularly, by JPEG compression, unintended patterns are generated, which are referred to as mosquito noise and block noise, and therefore the appearance of the image is deteriorated. As a method of mitigating noise generated in the image, for example, there is a smoothing process of suppressing high-frequency components in which noise is apt to be generated. However, the high-frequency components included in the original image are also suppressed, which often leads to a decrease in the sense of resolution.

As methods of improving the decrease in the sense of resolution caused by resolution conversion and a smoothing process, there are a sharpening process of emphasizing the edges, and a super-resolution process of supplementing the outline part and the texture part with information. Generally, the latter is known to have higher effects in increasing the sense of resolution, than the former.

As a method of the super-resolution process, there is a method referred to as learning-type super-resolution. The learning-type super-resolution can be roughly divided into a learning process and a super-resolution process. In the learning process, the process of deteriorating the image is learned by using multiple training images that are prepared in advance, and a dictionary is constructed, which stores patterns before deterioration and patterns after deterioration. In the super-resolution process, the resolution is improved by supplementing the image whose resolution has decreased, with high frequency components, by referring to the dictionary constructed in the learning process.

Furthermore, in a conventionally known learning-type super-resolution technology, in the learning process, a plurality of pairs of image patches are registered in the dictionary. A pair of image patches are images of small areas (patches) corresponding to each other, which are respectively cut out from the training image and from a low-resolution image obtained by decreasing the resolution of the training image. In the super-resolution process, an input image is supplemented with high-frequency components by using the dictionary (see Patent Document 1, Non-patent Document 1).

Furthermore, in another conventionally known technology, in the learning process, multiple pairs of image patches are used. The image patches are resolved into a basic structural element referred to as a base, to construct a dictionary (see Non-patent Document 2).

The conventional technology is proposed from the viewpoint of how to restore an original image to have high-quality, under conditions where only a low-quality input image can be obtained (if a high-quality input image is obtained in the first place, there is no need to restore the input image), and multiple high-quality training images, which have been prepared separately, are used to construct the dictionary. Therefore, in order to construct a dictionary that can handle any low-quality image, the size of the dictionary becomes enormous, which leads to an increase in the calculation time in the learning process and the super-resolution process.

Furthermore, in the conventional technology, consideration is not made with respect to problems that arise when transmitting the input low-quality image by a network, etc. When low-quality images are sent for the purpose of network transmission or database storage, and the low-quality images are restored by learning-type super-resolution at the reception destination where the image received, a dictionary needs to be prepared in advance at the reception destination. However, it is difficult to prepare training images for handling any image.

Patent Document 1: Japanese Laid-Open Patent Publication No. 2003-018398

Non-patent Document 1: Senda, et. al, "Example-based Super Resolution to Achieve Fine Magnification of Low-Resolution Images", NEC Technical Journal, Vol. 65, No. 2 (2012)

Non-patent Document 2: J. Yang, et. al, "Image Super-Resolution via Sparse Representation," IEEE Transactions on Image Processing, Vol. 19, Issue 11, pp. 1-13 (2010)

SUMMARY OF THE INVENTION

The present invention provides an image processing system, an image output device, and an image processing method, in which one or more of the above-described disadvantages are eliminated.

According to an aspect of the present invention, there is provided an image processing system including an image reading device; and an image output device, wherein the image reading device includes an image conversion unit configured to create a low-quality image by reducing a quality of a predetermined image, a dictionary creating unit configured to create a dictionary for restoring the low-quality image to the predetermined image, the dictionary being created by using the predetermined image and the low-quality image, and a sending unit configured to send the low-quality image and the dictionary or information relating to the dictionary, and wherein the image output device includes a receiving unit configured to receive the low-quality image and the dictionary or the information relating to the dictionary, and an image restoring unit configured to restore the low-quality image to the predetermined image, by using the dictionary or the information relating to the dictionary.

According to an aspect of the present invention, there is provided an image output device including a receiving unit configured to receive a low-quality image and a dictionary or information relating to the dictionary, the low-quality image being obtained by reducing a quality of a predetermined image, and the dictionary being used for restoring the low-quality image to the predetermined image; and an image restoring unit configured to restore the low-quality image to the predetermined image, by using the low-quality image and the dictionary or the information relating to the dictionary.

According to an aspect of the present invention, there is provided an image processing method executed by an image processing system including an image reading device and an image output device, the image processing method including creating, by the image reading device, a low-quality image by reducing a quality of a predetermined image; creating, by the image reading device, a dictionary for performing a super-resolution process on the low-quality image, the dictionary being created by using the predetermined image and the low-quality image; and performing, by the image output device, the super-resolution process on the low-quality image, by using the low-quality image and the dictionary.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

First Embodiment

In the following, a description is given of a first embodiment of the present invention, with reference to FIGS. 1 and 2.

Figure 1:
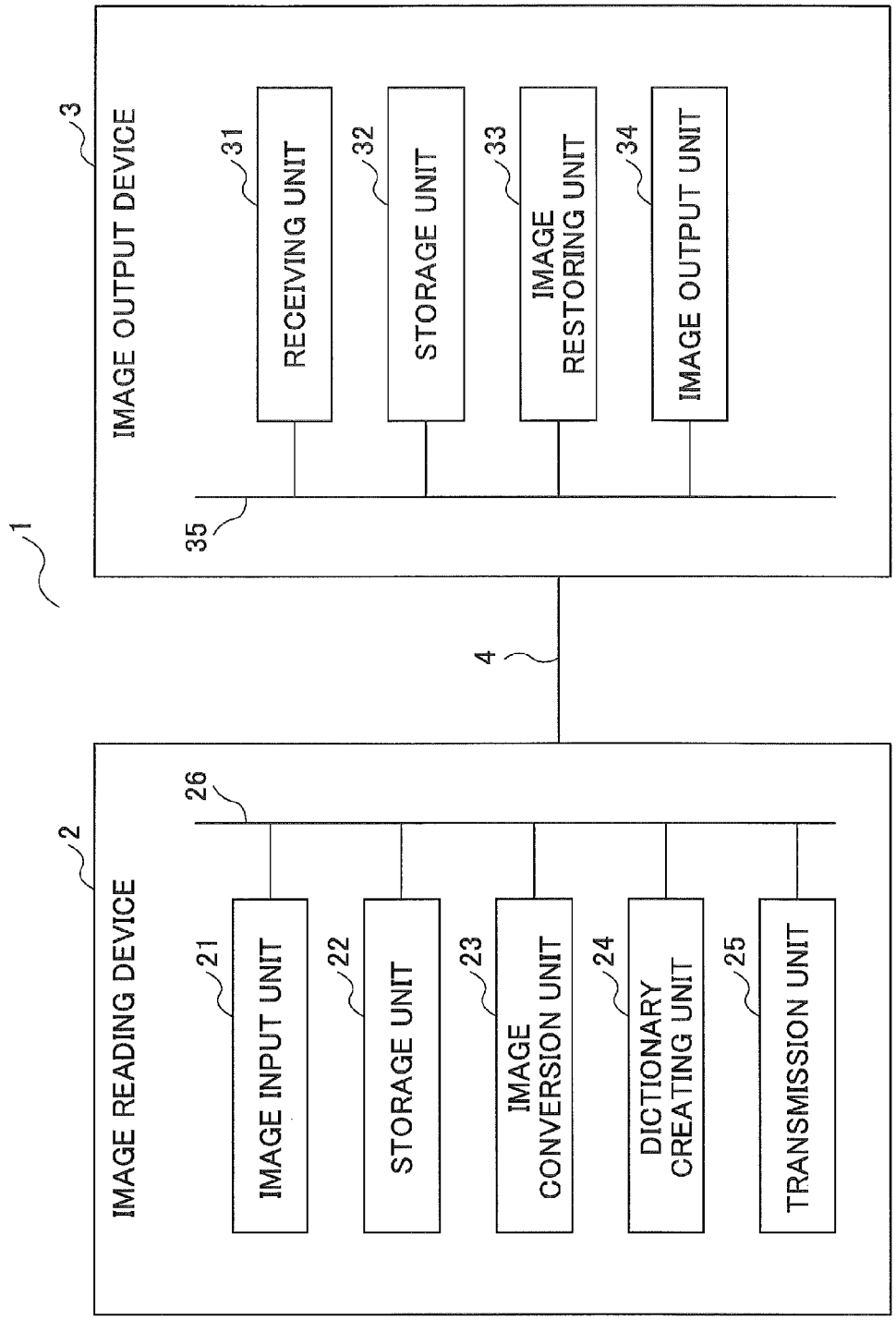
FIG. 1 is a schematic diagram of an image processing system according to a first embodiment.

FIG. 1 is a schematic diagram of an image processing system 1 according to the first embodiment.

The image processing system 1 according to the first embodiment includes an image reading device 2 and an image output device 3. The image reading device 2 and the image output device 3 are connected by a network bus 4.

The image reading device 2 includes an image input unit 21, an image conversion unit 23, a dictionary creating unit 24, a storage unit 22, a transmission unit 25, and a network bus 26 connecting these units.

The image input unit 21 inputs an image that has been read from a recording medium such as a CD (Compact Disc), a DVD (Digital Versatile Disc), a HDD (Hard Disk Drive), etc., or a network storage, or an image that has been created with the use of an image reading unit such as a scanner, camera, etc. (not shown).

The image conversion unit 23 reduces the quality of the image by any method, such as a band path filter process of extracting only a particular frequency band, a lossy compression process such as JPEG compression, resolution conversion of thinning pixels, etc., to create a low quality image.

The dictionary creating unit 24 cuts out areas corresponding to each other, from an input image and a low-quality image, respectively, to obtain a pair of image patches. The pair of image patches is constituted by a high-quality patch cut out from the input image and a low-quality patch cut out from a low-quality image. This operation of cutting out images is repeated with respect to a plurality of areas, to obtain a plurality of pairs of image patches. Then, the pairs of image patches are bundled together to create the dictionary for super-resolution. Note that the pixel values of the pair of image patches obtained by cutting out the images may be directly registered in the dictionary as an entry. Alternatively, the pixel values may be corrected such that various statistics values such as the maximum value, the minimum value, the average, the variance, etc., of the pixel values are included within a predetermined range, and the corrected pixel values may be registered as an entry. Furthermore, each entry does not need to store the actual pixel value of the image. For example, with respect to the low-quality patch, a value obtained by performing first derivation or second derivation on the pixel value may be used, or a local feature amount such as SIFT (Scale Invariant Feature Transform) and SURF (Speeded Up Robust Features) may be derived and used. Meanwhile, with respect the high-quality patch, for example, a difference value between the input image and the low-quality image may be used. If every single pair of image patches is included in the dictionary, the number of entries becomes enormous, and therefore a pair of image patches, which has a similarity degree with respect to another pair of image patches that is higher than a similarity degree set in advance, may be deleted from the dictionary.

The storage unit 22 stores input images input from the image input unit 21, low-quality images processed at the image conversion unit 23, the dictionary created at the dictionary creating unit 24, etc.

The transmission unit 25 sends the low-quality image and the dictionary for super-resolution stored in the storage unit 22, to the image output device 3 via the network bus 4.

The image output device 3 includes a receiving unit 31, a storage unit 32, an image restoring unit 33, an image output unit 34, and a network bus 35 connecting these units.

The receiving unit 31 receives the low-quality image and the dictionary for super-resolution, from the image reading device 2 via the network bus 4.

The image restoring unit 33 uses the low-quality image and the dictionary, to create a restored image obtained by performing a super-resolution process on the low-quality image that has been input, by the following procedures. First, an image patch obtained by cutting out an area (target area) from the low-quality image is compared with the low-quality patches in the entries of the dictionary, and at least one entry of an image, which has a high similarity degree with respect to the cut-out image patch, is acquired from the dictionary. Note that the similarity degree may be determined by any method for determining the similarity degree of images, such as by determining the size of the Euclidean distance. Next, the high-quality patch of the at least one entry that has been acquired is read, and the high-quality patch is combined with the cut-out patch according to a predetermined standard, to create a combination patch. The standard of combination is, for example, a simple average, a weighted average according to the similarity degree, etc. Finally, the combination patch is superimposed on the target area in the low-quality image.

When superimposing the combination patch, all of the original pixel values may be replaced, or pixel values may be added to the original pixel values. This is repeated for all of the areas in the low-quality image. Note that the target areas in the low-quality image may be cut out so as not to overlap each other, or may be cut out to overlap each other. When the target areas are overlapping, a weighted average is preferably applied in consideration of the overlap, when superimposing the combination patch.

The storage unit 32 stores the low-quality image and the dictionary received at the receiving unit 31, and the restored image created at the image restoring unit 33.

The image output unit 34 outputs the restored image stored in the storage unit 32, to a display, a storage medium such as a HDD, a printer, etc. (not shown).

Figure 2:
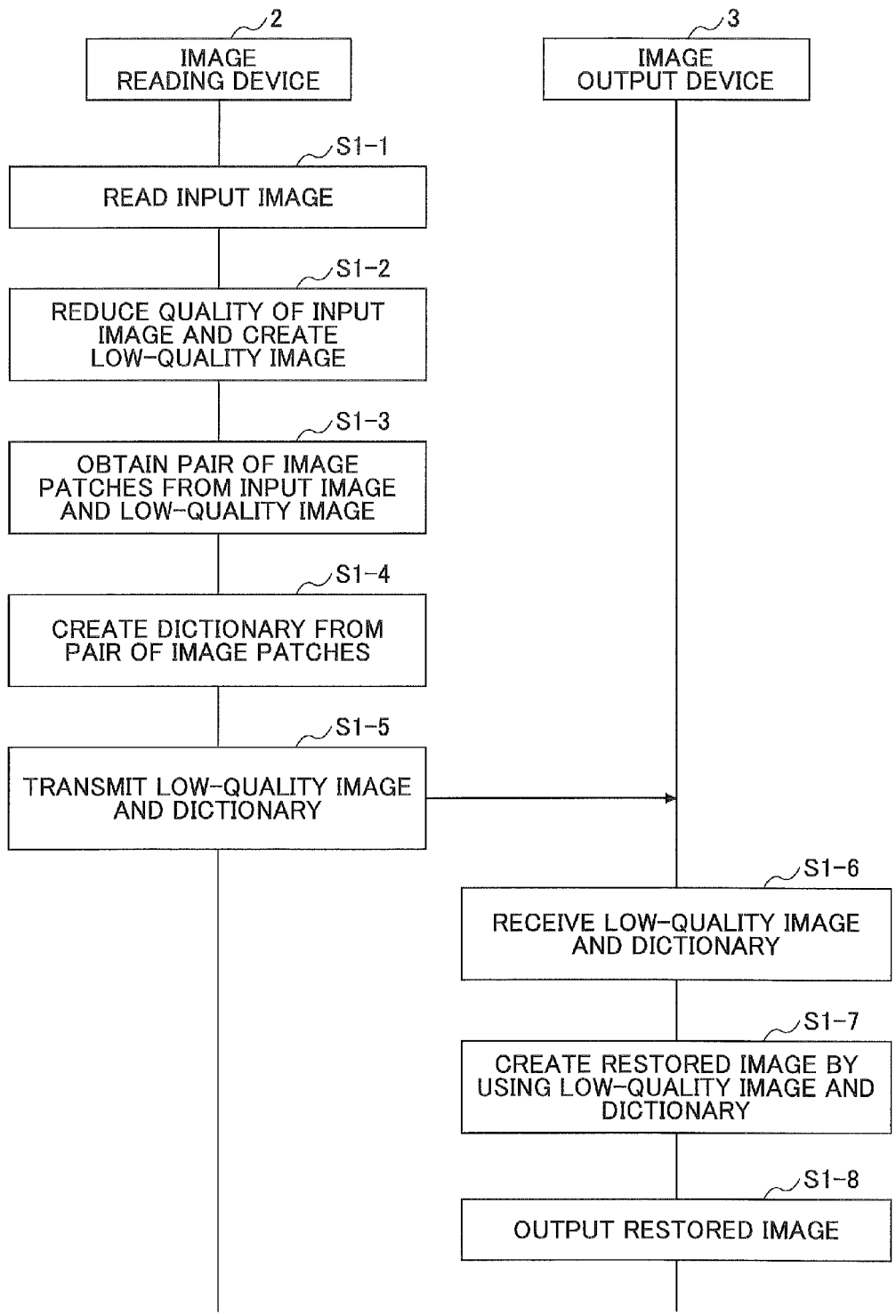
FIG. 2 is a flowchart according to the first embodiment.

FIG. 2 is a flowchart according to the first embodiment.

First, the image input unit 21 reads an input image (step S1-1). Next, the image conversion unit 23 reduces the quality of the input image to reduce the data amount, and creates a low-quality image (step S1-2). Next, the dictionary creating unit 24 obtains image patches from the input image and the low-quality image (step S1-3). Next, the dictionary creating unit 24 creates a dictionary from the pair of image patches (step S1-4). Then, the transmission unit 25 transmits the low-quality image and the dictionary to the image output device 3 through the network bus 4 (step S1-5).

The image output device 3 receives the low-quality image and the dictionary at the receiving unit 31 (step S1-6). Next, the image restoring unit 33 creates a restored image by using the low-quality image and the dictionary (step S1-7). Then, the image output unit 34 outputs the restored image (step S1-8).

Note that the processes of steps S1-3, S1-4, and S1-7 may be performed by directly applying the technology disclosed in Patent Document 1.

According to the first embodiment, when performing super-resolution, a dictionary is created from the input image that is the source of the low-quality image, and therefore an optimum dictionary for the low-quality image can be obtained. By using this dictionary to perform super-resolution on the low-quality image, it is possible to restore the input image with higher precision than the case of using a general-purpose dictionary.

Second Embodiment

A second embodiment of the present invention is different from the first embodiment in the following points.

The dictionary creating unit 24 creates a base from the image patches cut out from the input image and the low-quality image, to create the dictionary. The dictionary is formed by one or more bases (i.e., one or more bases are created).

The dictionary used for performing a super-resolution process by the image restoring unit 33, is a base created from the image patches cut out from the input image and the low-quality image.

The schematic diagram of the image processing system 1 according to the second embodiment is the same as that of the first embodiment illustrated in FIG. 1.

The dictionary creating unit 24 according to the second embodiment cuts out areas corresponding to each other from an input image and a low-quality image, to obtain a pair of image patches. The pair of image patches is constituted by a high-quality patch cut out from the input image and a low-quality patch cut out from the low-quality image. This operation of cutting out images is repeated with respect to a plurality of areas, to obtain a plurality of pairs of image patches. Then, a base, which is a common structure, is extracted from the plurality of pairs of image patches, and the extracted base is used for creating a dictionary. The method of constructing a base is widely known as described in Non-patent Document 1, and therefore details are not described herein.

The image restoring unit 33 according to the second embodiment creates a restored image by using a dictionary that has been created by using the low-quality image and the base.

Figure 3:
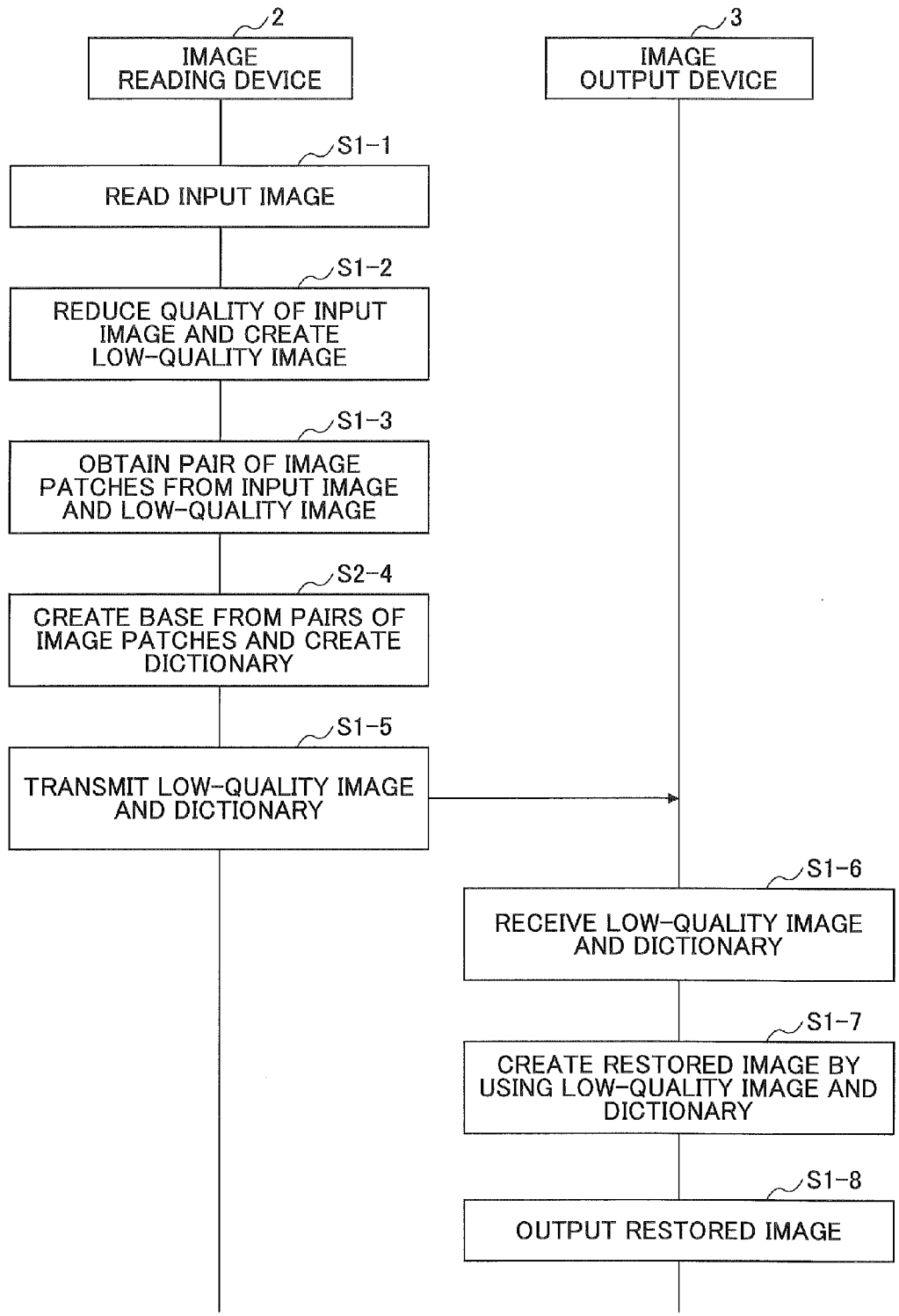
FIG. 3 is a flowchart according to a second embodiment.

FIG. 3 is a flowchart according to the second embodiment. FIG. 3 is different from the flowchart according to the first embodiment in FIG. 2 in that instead of step S1-4, in step S2-4, a base is created from the pairs of image patches to create a dictionary. Otherwise, the processes of FIG. 3 are the same as those of FIG. 2.

When the image patches are directly used as a dictionary entry, the structures of the respective image patches are complicated, and therefore a plurality of dictionary entries are required for restoring the intended structure. Meanwhile, by using a base, the structures of the respective dictionary entries are simple, and therefore the intended structure can be efficiently restored, by using a combination of a relatively small number of dictionary entries. Accordingly, according to the second embodiment, the size of the dictionary can be suppressed to a small scale compared to the first embodiment, and therefore it is possible to reduce the storage volume and the network transmission amount, and to further reduce the processing time taken for checking the dictionary.

Third Embodiment

A third embodiment of the present invention is different from the first and second embodiments in that the dictionary is registered in a server device 5 that is a database, and the ID of the dictionary for searching for the dictionary is sent from the server device 5.

Figure 4:
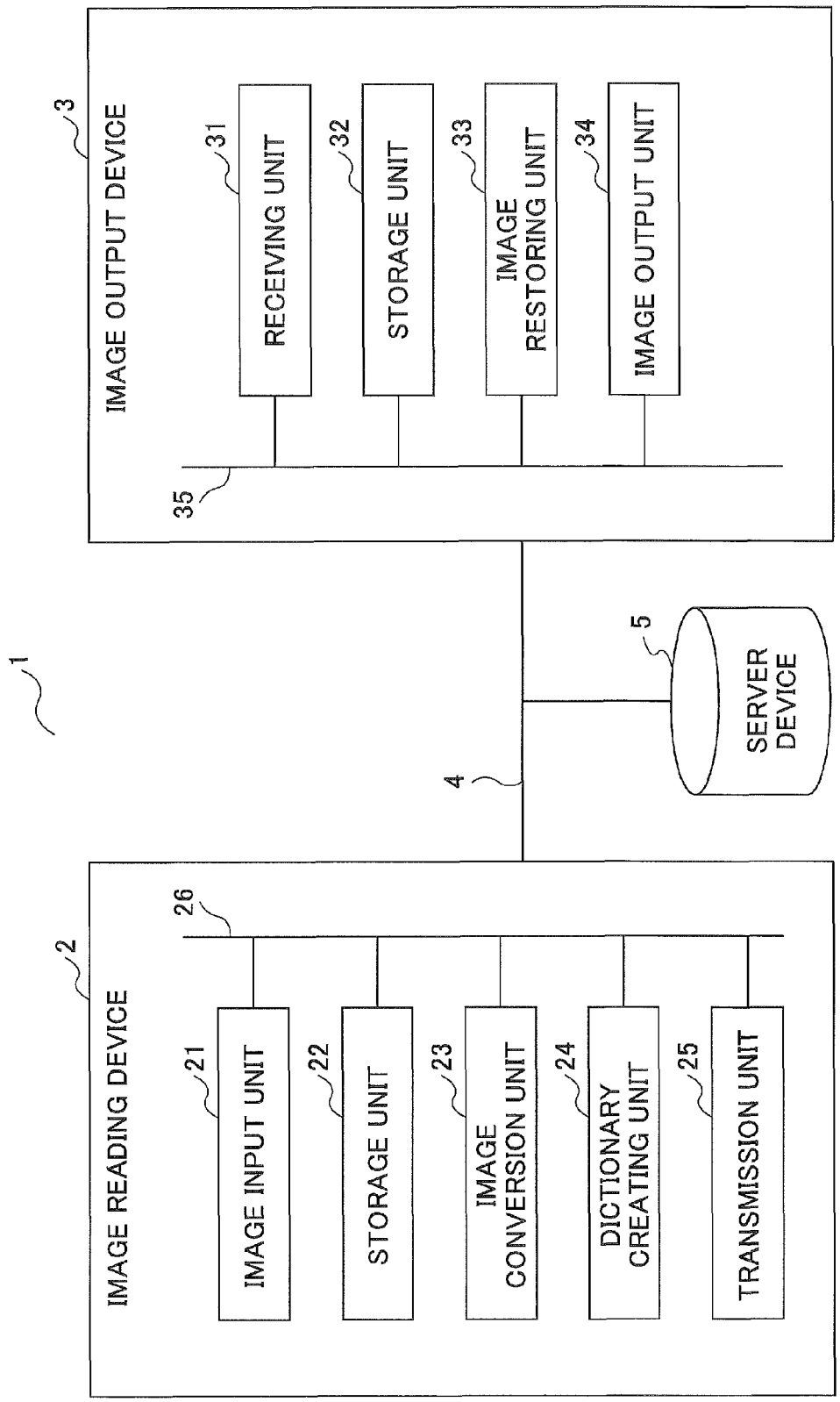
FIG. 4 is a schematic diagram of the image processing system according to a third embodiment.

FIG. 4 is a schematic diagram of the image processing system 1 according to the third embodiment. The image processing system 1 according to the third embodiment is different from those of the first and second embodiments in that the server device 5 is included.

Furthermore, the transmission unit 25 according to the third embodiment stores the dictionary, which is read from the storage unit 22, in the server device 5 together with the dictionary ID for identifying the dictionary, through the network bus 4. The unique ID may be assigned by the image reading device 2 or by the server device 5. Then, the low-quality image is read from the storage unit 22 and is sent to the image output device 3 together with ID of the dictionary, through the network bus 4.

Furthermore, the receiving unit 31 according to the third embodiment receives the low-quality image and the ID of the dictionary, and reads the dictionary from the server device 5 based on the unique ID.

Figure 5:
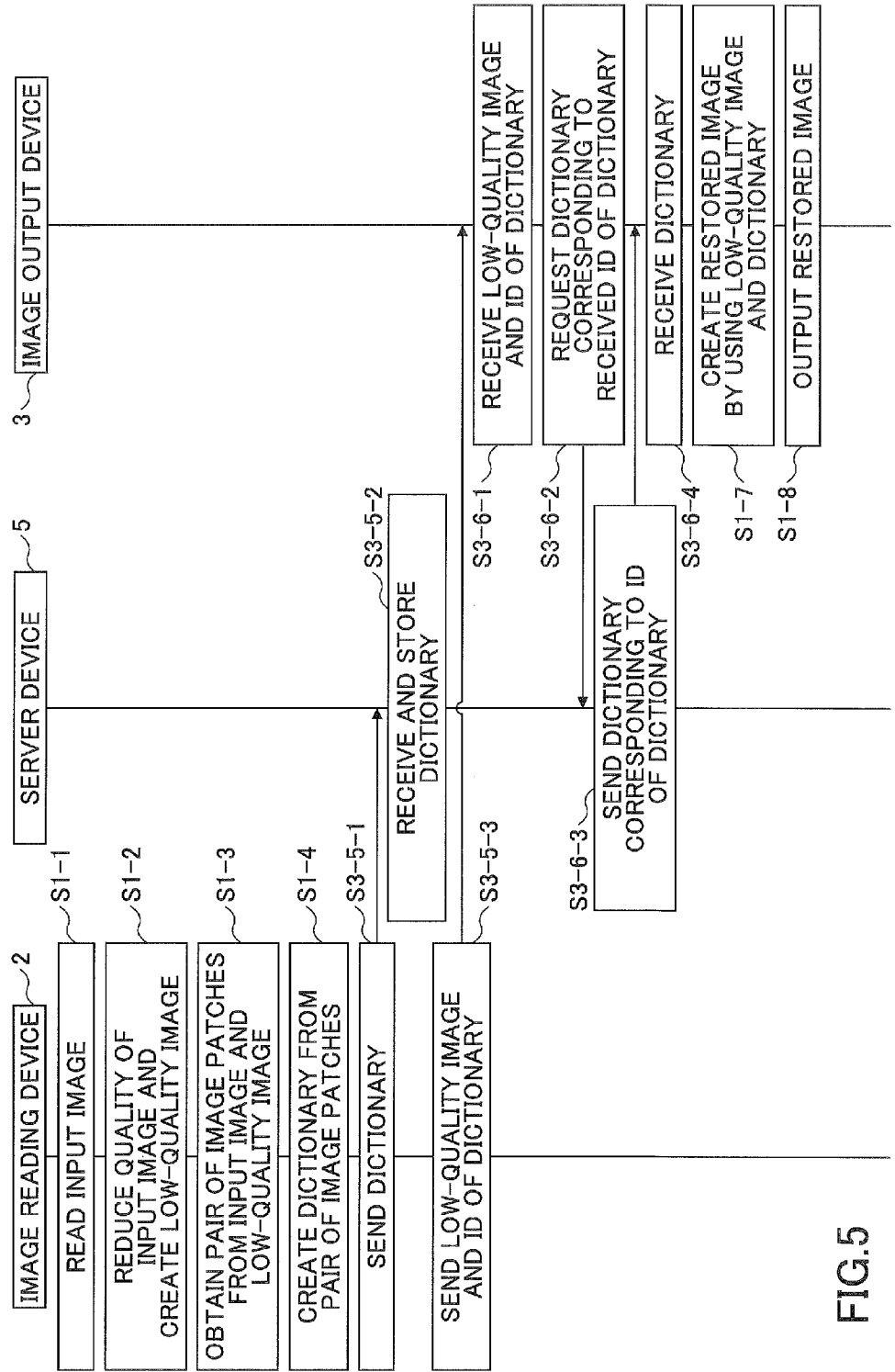
FIG. 5 is a flowchart according to the third embodiment.

FIG. 5 is a flowchart according to the third embodiment. FIG. 5 is different from the flowcharts according to the first and second embodiments in FIGS. 2 and 3 in that instead of step S1-5, in step S3-5-1, the dictionary is sent to the server device 5, in step S3-5-2, the server device 5 stores the dictionary, and in step S3-5-3, the ID of the dictionary is sent together with the low-quality image. Furthermore, instead of step S1-6, in step S3-6-1, the image output device 3 receives the low-quality image and the ID of the dictionary, in step S3-6-2, the image output device 3 requests the server device 5 to provide the dictionary corresponding to the received ID of the dictionary, in step S3-6-3, the server device 5 sends the dictionary corresponding to the ID of the dictionary, and in step S3-6-4, the image output device 3 receives the dictionary. Otherwise, the processes of FIG. 4 are the same as those of FIGS. 2 and 3.

Note that when the image reading device 2 sends the low-quality image and the dictionary to the server device 5 by specifying the image output device 3 to be the destination, the server device 5 may store the dictionary and report the low-quality image and the dictionary ID of the dictionary to the image output device 3 specified as the destination.

According to the third embodiment, the dictionary is temporarily stored in the server device 5, and according to need, the receiving side acquires the dictionary from the server device 5, such that the transmission timings of the low-quality image and the dictionary can be shifted from each other, and the network load can be reduced. Furthermore, the receiving side may not immediately perform super-resolution on the low-quality image, and therefore by acquiring the dictionary when needed, it is possible to reduce not only the network load but also the data amount stored in the storage unit 32.

Fourth Embodiment

A fourth embodiment of the present invention is different from the third embodiment in that, instead of registering the dictionary in the server device 5 and sending, from the server device 5, an ID of the dictionary for searching for the dictionary, an entry that is closest to the entry of the dictionary created by the dictionary creating unit 24 is selected from the entries of dictionary already registered in the server device 5, and the ID of the entry for searching for the entry is sent from the server device 5.

Figure 6:
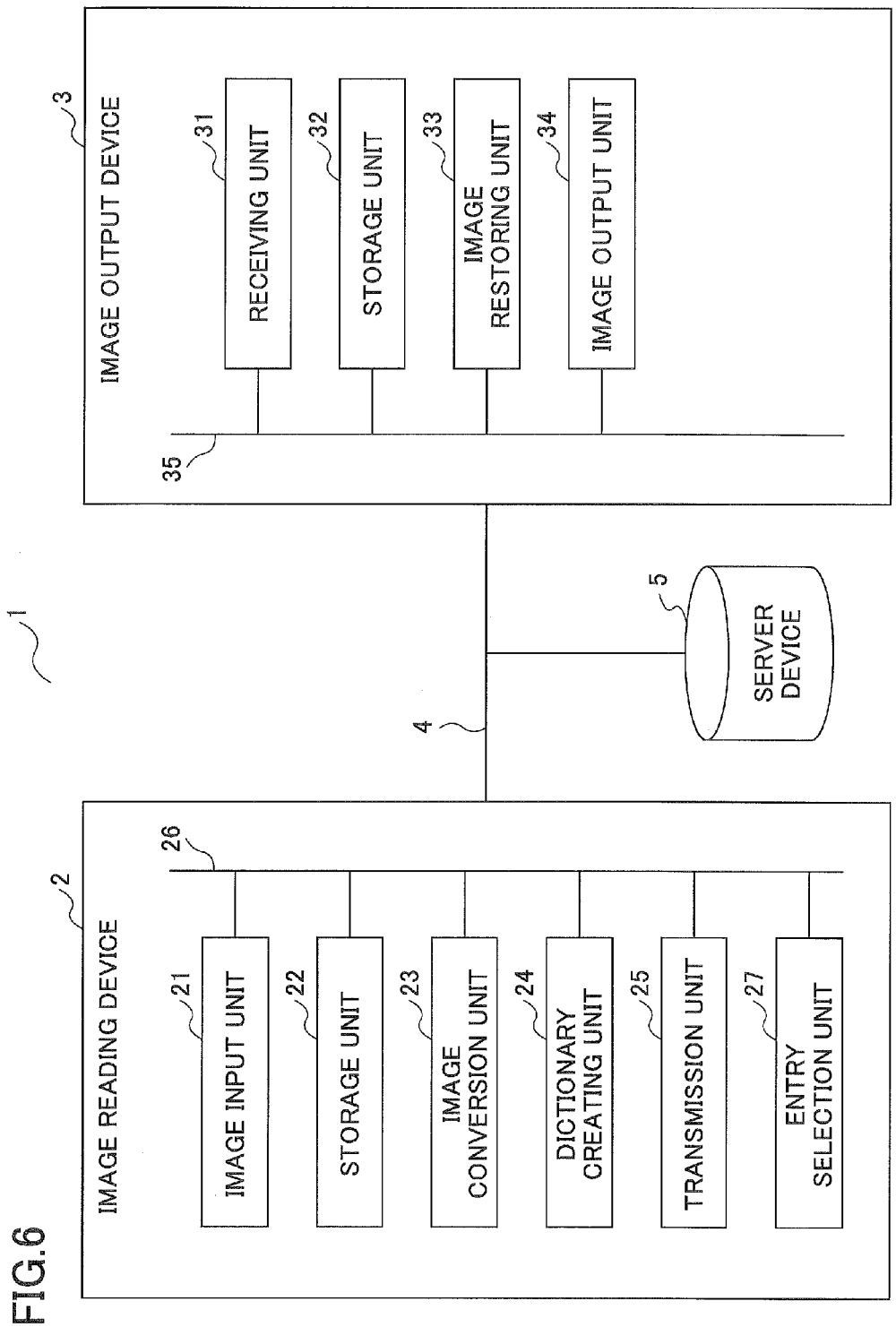
FIG. 6 is a schematic diagram of the image processing system according to a fourth embodiment.

FIG. 6 is a schematic diagram of the image processing system 1 according to the fourth embodiment. The image processing system 1 according to the fourth embodiment is different from that of the third embodiment in that the image reading device 2 includes an entry selection unit 27.

The entry selection unit 27 reads a dictionary (local dictionary) stored in the storage unit 22, and reads a dictionary (network dictionary) stored in the server device 5, from the server device 5. Then, the entry selection unit 27 compares an entry of the local dictionary with the entries of the network dictionary. When the entry selection unit 27 finds an entry having a high similarity degree, the entry selection unit 27 acquires the ID of the network dictionary (dictionary ID) and the ID of the entry (entry ID). An entry ID having the highest similarity degree may be used, or only an entry ID that satisfies a predetermined standard may be used. When an entry satisfying a predetermined standard is not found, the entry of the local dictionary may be added to the network dictionary, a new entry ID may be assigned to the added entry, and this new entry ID may be acquired. The above process is performed for all entries of local dictionary.

The transmission unit 25 according to the fourth embodiment reads a low-quality image from the storage unit 22, and sends the low-quality image together with a dictionary ID and an entry ID to the image output device 3 through the network bus 4.

The receiving unit 31 according to the fourth embodiment receives the low-quality image, the dictionary ID, and the entry ID, reads a dictionary entry from the server device 5 based on the dictionary ID and the entry ID, and stores the dictionary entry in the storage unit 32. The dictionary entries are bundled together to reconstruct a dictionary.

Figure 7:
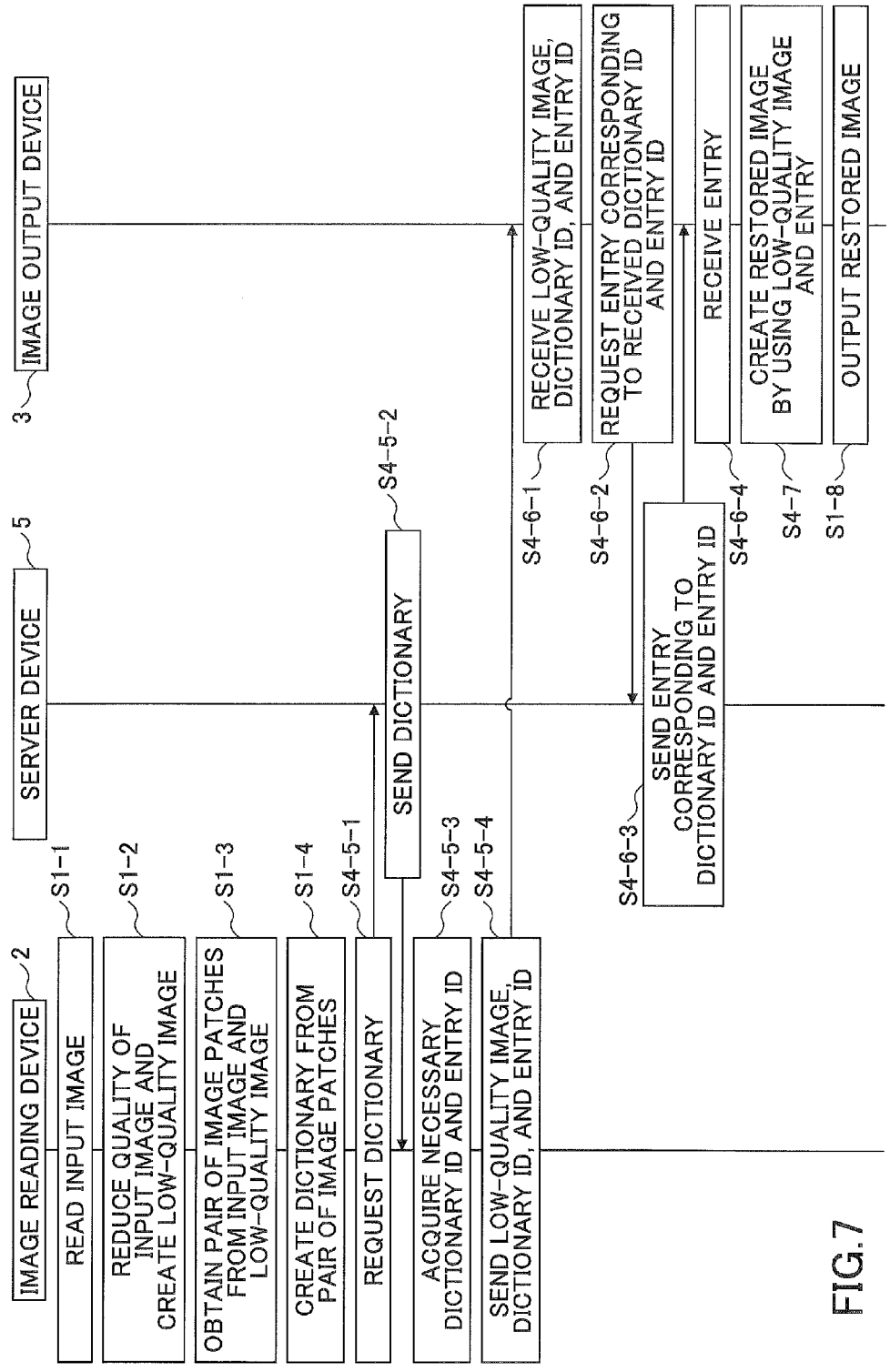
FIG. 7 is a flowchart according to the fourth embodiment.

FIG. 7 is a flowchart according to the fourth embodiment. FIG. 7 is different from the flowcharts according to the first and second embodiments in FIGS. 2 and 3 in that instead of steps S1-5, S1-6, and S1-7, the processes of steps S4-5-1 through S4-5-4, steps S4-6-1 through S4-6-4, and step S4-7 are performed.

In step S4-5-1, the image reading device 2 requests the server device 5 to send the dictionary stored in the server device 5, and in step S4-5-2, the server device 5 sends the dictionary to the image reading device 2. In step S4-5-3, the image reading device 2 acquires the necessary ID of the dictionary and the ID of the entry, from the dictionary received from the server device 5, and in step S4-5-4, the image reading device 2 sends the dictionary ID and the entry ID together with the low-quality image.

In step S4-6-1, the image output device 3 receives the low-quality image, the dictionary ID, and the entry ID, and in step S4-6-2, the image output device 3 requests the server device 5 to provide the entry corresponding to the dictionary ID and the entry ID. In step S4-6-3, the server device 5 sends the entry corresponding to the dictionary ID and the entry ID, and in step S4-6-4, the image output device 3 receives the entry.

In step S4-7, the image restoring unit 33 creates a restored image by using the low-quality image and the dictionary constituted by the plurality of entries that have been received. Otherwise, the processes of FIG. 7 are the same as those of FIGS. 2 and 3.

Note that the entry selection unit 27 may be provided in the server device 5 instead of in the image reading device 2. In this case, the operations are as follows. The image reading device 2 specifies the image output device 3 to be the destination, and sends the low-quality image and the local dictionary to the server device 5. The server device 5 compares the entry included in the local dictionary with the entries of the network dictionary already stored in the server device 5, and when the server device 5 finds an entry having a similarity degree that satisfies a predetermined standard, the server device 5 reports the dictionary ID of the network dictionary and the entry ID, to the image reading device 2 or to the image output device 3 that is the destination specified by the image reading device 2. When an entry satisfying a predetermined standard is not found, the entry of the local dictionary may be added to the network dictionary, a new entry ID may be assigned to the added entry, and this new entry ID may be reported. The above process is performed for all entries of local dictionary.

According to the fourth embodiment, there is no need to register, in the server device 5, the entire local dictionary created by the image reading device 2, and therefore the volume of the data stored in the server device 5 can be further reduced compared to the third embodiment.

Modification Example

The image reading device 2, the image output device 3, and the server device 5 may be provided as separate devices, or all of these devices may be provided in a single device.

The processing units of the image reading device 2 and the image output device 3 may be provided in a single device, or some of the processing units may be provided in another device connected via a network, etc.

According to one embodiment of the present invention, an image processing system, an image output device, and an image processing method are provided, which are capable of realizing high restoration performance without the need of preparing multiple training images, and by a smaller number of entries than those included in a general-purpose dictionary.

The image processing system, the image output device, and the image processing method are not limited to the specific embodiments described herein, and variations and modifications may be made without departing from the spirit and scope of the present invention.

The present application is based on and claims the benefit of priority of Japanese Priority Patent Application No 2015-000716, filed on Jan. 6, 2015, the entire contents of which are hereby incorporated herein by reference.

What is claimed is:

1. An image processing system comprising:
   an image reading device; and
   an image output device, wherein
   the image reading device includes
      an image converter that creates a low-quality image by reducing a quality of a predetermined image,
      a dictionary creator that creates a dictionary for restoring the low-quality image to the predetermined image, the dictionary being created by using the predetermined image and the low-quality image, and
      a sending device that sends the low-quality image and the dictionary or information relating to the dictionary, and wherein
   the image output device includes
      a receiver that receives the low-quality image and the dictionary or the information relating to the dictionary, and
      an image restoring device that restores the low-quality image to the predetermined image, by using the dictionary or the information relating to the dictionary,
   and wherein
   the sending device sends the dictionary to a server device,
   the receiver receives, from the sending unit or the server device, identification information of the dictionary that is the information relating to the dictionary, and acquires the dictionary from the server device based on the identification information, and
   the image restoring device restores the low-quality image to the predetermined image, by using the dictionary.

2. The image processing system according to claim 1, wherein
   the sending device sends the low-quality image and the dictionary to the image output device,
   the receiver receives the low-quality image and the dictionary, and
   the image restoring device restores the low-quality image to the predetermined image, by using the dictionary.

3. The image processing system according to claim 1, wherein
   the image reading device includes an entry selecting unit configured to receive a network dictionary stored in a server device, and select, from entries in the network dictionary, an entry similar to an entry included in the dictionary created by the dictionary creating unit,
   the sending device sends the low-quality image and identification information of the entry selected by the entry selecting unit,
   the receiver receives the low-quality image and the identification information of the entry that is the information relating to the dictionary, and acquires the entry from the server device based on the identification information, and
   the image restoring device restores the low-quality image to the predetermined image, by using the acquired entry.

4. The image processing system according to claim 3, wherein
   when an entry, which is similar to an entry included in the dictionary created by the dictionary creator, is not found among the entries in the network dictionary, the entry selecting unit stores the entry included in the dictionary created by the dictionary creator, in the server device.

5. The image processing system according to claim 1, wherein
   the sending device sends the dictionary to a server device,
   the receiver receives, from the sending device or the server device, identification information of an entry, which is included in a dictionary stored in the server device and which is similar to an entry included in the dictionary created by the dictionary creator, and acquires the entry from the server device based on the identification information that is the information relating to the dictionary, and
   the image restoring unit restores the low-quality image to the predetermined image, by using the low-quality image and the acquired entry.

6. An image output device provided to an image processing system that includes an image reading device,
   said image reading device including:
      an image convertor that creates a low-quality image by reducing a quality of a predetermined image,
      a dictionary creator that creates a dictionary for restoring the low-quality image to the predetermined image, the dictionary being created by using the predetermined image and the low-quality image, and
      a sending device that sends the low-quality image and the dictionary or information relating to the dictionary,
   said image output device comprising:
      a receiver that receives a low-quality image and a dictionary or information relating to the dictionary, the low-quality image being obtained by reducing a quality of a predetermined image, and the dictionary being used for restoring the low-quality image to the predetermined image; and
      an image restoring device configured to restore the low-quality image to the predetermined image, by using the low-quality image and the dictionary or the information relating to the dictionary, wherein
      the sending device sends the dictionary to a server device,
      the receiver receives, from the sending unit or the server device, identification information of the dictionary that is the information relating to the dictionary, and acquires the dictionary from the server device based on the identification information, and
      the image restoring device restores the low-quality image to the predetermined image, by using the dictionary.

7. An image processing method executed by an image processing system including an image reading device and an image output device, the image processing method comprising:
   creating, by the image reading device, a low-quality image by reducing a quality of a predetermined image;
   creating, by the image reading device, a dictionary for performing a super-resolution process on the low-quality image, the dictionary being created by using the predetermined image and the low-quality image;

performing, by the image output device, the super-resolution process on the low-quality image, by using the low-quality image and the dictionary, sending, by the image reading device, the dictionary to a server device, receiving, by the image output device, from the image reading device or the server device, identification information of the dictionary that is the information relating to the dictionary, and acquiring the dictionary from the server device based on the identification information, and restoring, by the image output device, the low-quality image to the predetermined image, by using the dictionary.

\* \* \* \* \*